(12) United States Patent
Wilson et al.

(10) Patent No.: US 10,620,643 B2
(45) Date of Patent: Apr. 14, 2020

(54) GAS FLOW FUEL METERING (71) Applicant: Woodward, Inc., Fort Collins, CO (US)

(72) Inventors: Kevin Emery Wilson, Windsor, CO (US); Timothy John Farrow, Fort Collins, CO (US)

(73) Assignee: Woodward, Inc., Fort Collins, CO (US)

( * ) Notice: Subject to any disclaimer, the term of this patent is extended or adjusted under 35 U.S.C. 154(b) by 0 days.

(21) Appl. No.: 15/134,175

(22) Filed: Apr. 20, 2016

(65) Prior Publication Data

US 2016/0306365 A1 Oct. 20, 2016

Related U.S. Application Data (60) Provisional application No. 62/150,017, filed on Apr. 20, 2015.

(51) Int. Cl.
| | |
|---|---|
| *G05D 7/06* | (2006.01) |
| *B23P 15/00* | (2006.01) |
| *F02C 9/26* | (2006.01) |
| *F02C 7/232* | (2006.01) |

(52) U.S. Cl.
CPC .......... *G05D 7/0635* (2013.01); *B23P 15/001* (2013.01); *F02C 7/232* (2013.01); *F02C 9/263* (2013.01)

(58) Field of Classification Search
CPC ....... G05D 7/0635; F02C 9/263; F02C 7/232; B23P 15/001
See application file for complete search history.

(56) References Cited

U.S. PATENT DOCUMENTS

| | | | | |
|---|---|---|---|---|
| 4,251,027 A | * | 2/1981 | Dehart | F24F 11/74 236/49.4 |
| 5,090,390 A | | 2/1992 | Feldinger | |
| 5,146,941 A | * | 9/1992 | Statler | G05D 7/0635 137/468 |

(Continued)

FOREIGN PATENT DOCUMENTS

CN 103375269 10/2013

OTHER PUBLICATIONS

PCT International Search Report and Written Opinion of the International Searching Authority, PCT/US2016/028250, dated Jul. 21, 2016, 10 pages.

(Continued)

*Primary Examiner* — Joseph J Dallo
*Assistant Examiner* — Kurt Philip Liethen
(74) *Attorney, Agent, or Firm* — Fish & Richardson P.C.

(57) ABSTRACT

A fuel metering valve includes a valve body housing a valve element in an interior chamber between an inlet port and an outlet port, an actuator coupled to move the valve element relative to the valve body, and a controller configured to regulate the position of the valve body. The valve element regulates a flow of fuel through the valve body. The controller regulates the position of the valve body via an actuator based on measurements by differential and absolute pressure sensors to achieve a target mass flow rate of the fuel through the valve body. The differential pressure sensor is calibrated for accuracy only across a limited scale range based on a predetermined maximum subsonic pressure.

15 Claims, 6 Drawing Sheets

(56) References Cited

U.S. PATENT DOCUMENTS

| | | | | |
|---|---|---|---|---|
| 5,158,230 | A | * | 10/1992 | Curran .................... F24F 13/10 |
| | | | | 236/49.4 |
| 5,388,607 | A | * | 2/1995 | Ramaker ................ F23N 1/005 |
| | | | | 137/487 |
| 6,016,832 | A | * | 1/2000 | Vars ..................... F02M 21/023 |
| | | | | 123/25 A |
| 6,990,964 | B2 | * | 1/2006 | Strohle .................. F23D 14/60 |
| | | | | 123/527 |
| 2003/0192595 | A1 | | 10/2003 | Benson |
| 2005/0021213 | A1 | * | 1/2005 | Miller .................... F02C 9/263 |
| | | | | 701/100 |

OTHER PUBLICATIONS

PCT International Search Report and Written Opinion of the International Searching Authority, PCT/US2016/028490, dated Jul. 21, 2016, 10 pages.

PCT International Preliminary Report on Patentability issued in PCT/US2016/028490 dated Nov. 2, 2017, 7 pages.

Chinese Office Action in Chinese Application No. 201680034615.3, dated Jan. 9, 2019, 18 pages with English Translation.

European Office Action in European Application No. 16722459, dated Jan. 29, 2019, 5 pages.

Second Chinese Office Action in Chinese Application No. 201680034615.3, dated Aug. 29, 2019, 11 pages with English Translation.

* cited by examiner

GAS FLOW FUEL METERING

CROSS-REFERENCE TO RELATED APPLICATIONS

This application is a claims the benefit of priority to U.S. Provisional Application Ser. No. 62/150,017, filed on Apr. 20, 2015, the contents of which are hereby incorporated by reference.

TECHNICAL FIELD

This specification relates to fuel metering valves for combustion engines that operate on gaseous fuels.

BACKGROUND

Gas fuel systems are used for a variety of internal combustion engines, such as reciprocating or turbine engines used on vehicles and in industrial settings. These engines may utilize fuel systems that provide natural gas (predominantly methane) from liquid natural gas (LNG) or compressed natural gas (CNG) sources, or other gaseous fuels such as propane or hydrogen. In many systems, a fuel metering valve operates to control the flow of gaseous fuel delivered to the engine. Accuracy and reliability concerns with respect to fuel metering valves are often based on error accumulation when the output from multiple sensors is used as input for fuel mass flow rate calculations.

SUMMARY

In a first aspect of the present disclosure, a fuel metering valve includes: a valve body housing a valve element in an interior chamber between an inlet port and an outlet port, the valve element regulating a flow of fuel through the valve body; an actuator coupled to move the valve element relative to the valve body; a controller configured to regulate the position of the valve body via the actuator based on a differential and absolute pressure measurement to achieve a target mass flow rate of the fuel through the valve body; and differential and absolute pressure sensors arranged to provide the pressure measurement(s). The differential pressure sensor is calibrated for accuracy only across a limited scale range based on a predetermined maximum subsonic differential pressure.

In some embodiments of the first aspect, the flow of fuel includes a flow of gaseous fluid.

In some embodiments of the first aspect, the controller is configured to identify a sonic or subsonic flow condition across the valve element based on the pressure measurement(s). In some embodiments of the first aspect, the controller is further configured to: in response to identifying a subsonic flow condition, implement a first set of one or more flow equations to achieve the target mass flow rate; and in response to identifying a sonic flow condition, implement a second set of one or more different flow equations to achieve the target mass flow rate. In some embodiments of the first aspect, only the first set of flow equations include the differential pressure measurement as an input.

In some embodiments of the first aspect, the differential pressure sensor is fluidically coupled to an upstream pressure probe and a downstream pressure probe, such that the differential pressure measurement corresponds to a pressure differential across the valve element. In some embodiments of the first aspect, the upstream pressure probe includes a pitot probe and the downstream pressure probe includes a static pressure probe. In some embodiments of the first aspect, the predetermined maximum subsonic differential pressure includes a maximum expected subsonic pressure differential determined as the largest magnitude pressure difference that corresponds to a pressure ratio greater than or equal to the critical pressure for the fuel over an expected range of system operating conditions.

In some embodiments of the first aspect, the limited scale range defines an upper limit less than or equal to a predetermined maximum differential pressure of the fuel metering valve. In some embodiments of the first aspect, the limited scale range defines an upper limit greater than or equal to the predetermined maximum subsonic differential pressure.

In a second aspect of the present disclosure, a combustion engine system includes: a fuel source; an engine that generates mechanical power via combustion of fuel provided by the fuel source; and a fuel metering valve located upstream of the engine and downstream of the fuel source, the fuel metering valve regulating the flow of gaseous fuel provided from the fuel source. The fuel metering valve includes: a valve body housing a valve element in an interior chamber between an inlet port and an outlet port, the valve element regulating a flow of fuel through the valve body; an actuator coupled to move the valve element relative to the valve body; a controller configured to regulate the position of the valve body via the actuator based on differential and absolute pressure measurements to achieve a target mass flow rate of the fuel through the valve body; and differential and absolute pressure sensors arranged to provide the pressure measurements. The differential pressure sensor is calibrated for accuracy only across a limited scale range based on a predetermined maximum subsonic differential pressure.

In some embodiments of the second aspect, the combustion engine system further includes an engine control unit communicatively coupled to the fuel metering valve and configured to provide the target mass flow rate via a fuel demand signal.

In some embodiments of the second aspect, the flow of fuel includes a flow of gaseous fluid.

In some embodiments of the second aspect, the controller is configured to identify a sonic or subsonic flow condition across the valve element based on the differential pressure measurement. In some embodiments of the second aspect, the controller is further configured to: in response to identifying a subsonic flow condition, implement a first set of one or more flow equations to achieve the target mass flow rate; and in response to identifying a sonic flow condition, implement a second set of one or more different flow equations to achieve the target mass flow rate. In some embodiments of the second aspect, only the first set of flow equations include the differential pressure measurement as an input.

In some embodiments of the second aspect, the differential pressure sensor is fluidically coupled to an upstream pressure probe and a downstream pressure probe, such that the differential pressure measurement corresponds to a pressure differential across the valve element. In some embodiments of the second aspect, the upstream pressure probe includes a pitot probe and the downstream pressure probe includes a static pressure probe. In some embodiments of the second aspect, the predetermined maximum subsonic differential pressure includes a maximum expected subsonic pressure differential determined as the largest magnitude pressure difference that corresponds to a pressure ratio greater than or equal to the critical pressure for the fuel over an expected range of system operating conditions.

In some embodiments of the second aspect, the limited scale range defines an upper limit less than or equal to a predetermined maximum differential pressure of the fuel metering valve. In some embodiments of the second aspect, the limited scale range defines an upper limit greater than or equal to the predetermined maximum subsonic differential pressure.

In a third aspect of the present disclosure, a method of constructing a fuel metering valve includes: identifying a plurality of operating conditions over an expected operating range of a combustion engine system; determining a maximum expected subsonic differential pressure based on identified operating conditions; and installing a differential pressure sensor into the fuel metering valve, the differential pressure sensor being calibrated for accuracy only across a limited scale range based on the determined maximum expected subsonic differential pressure. In some embodiments, calibration of the differential pressure sensor further includes incorporating appropriate error margin while still remaining less than the maximum expected differential pressure.

In some embodiments of the third aspect, identifying the plurality of operating conditions includes identifying a plurality of upstream and downstream pressure pairs over the expected operating range of the combustion engine system. In some embodiments of the third aspect, determining the maximum expected subsonic differential pressure includes determining, based on the plurality of upstream and downstream pressure pairs, the largest magnitude pressure difference that corresponds to a pressure ratio greater than or equal to a critical pressure for a predetermined fuel (e.g., with appropriate margins).

In some embodiments of the third aspect, installing the differential pressure sensor includes fluidically coupling the differential pressure sensor to an upstream pressure probe and a downstream pressure probe. In some embodiments of the third aspect, the upstream pressure probe includes a pitot probe and the downstream pressure probe includes a static pressure probe. In some embodiments of the third aspect, installing the differential pressure sensor further includes positioning the differential pressure sensor within a housing of a sensor module communicatively coupled to a main controller of the fuel metering valve.

In some embodiments of the third aspect, the limited scale range defines an upper limit less than or equal to a predetermined maximum differential pressure of the fuel metering valve. In some embodiments of the third aspect, the limited scale range defines an upper limit greater than or equal to the maximum expected subsonic differential pressure.

The details of one or more implementations of the subject matter described in this specification are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings may indicate like elements.

DETAILED DESCRIPTION

Figure 1:
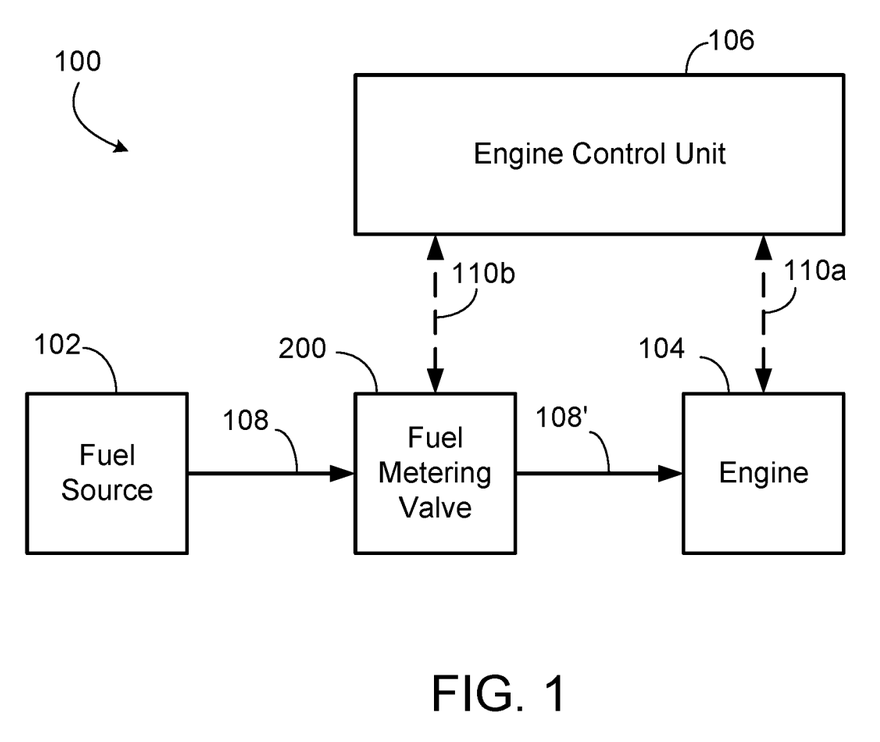
FIG. 1 is schematic diagram of an example combustion engine system.

Referring first to FIG. 1, a combustion engine system 100 includes a fuel source 102, a fuel metering valve 200, an engine 104, and an engine control unit (ECU) 106. The engine 104 generates mechanical power via combustion of a gaseous fuel provided by the fuel source 102. In some examples, the engine 104 is an industrial or aeroderivative gas turbine engine. The gas turbine engine may include an upstream compressor coupled to a downstream turbine with a combustion chamber located therebetween. The combustion chamber receives air from the compressor and gaseous fuel from the fuel source 102, and the fuel-air mixture is ignited to generate high temperature, high pressure fluid flow to drive the shaft of the turbine. In some examples, the engine 104 is a reciprocating internal combustion engine featuring a movable piston driven by combustion energy from the gaseous fuel mixed with air. The linear motion of the piston is converted to rotational motion of a crankshaft by a suitable mechanical linkage (e.g., a connecting rod).

The fuel source 102 may include a large storage tank, smaller pressure vessels (e.g., compressed gas cylinders), and/or a gas transportation pipeline. The flow of gaseous fuel 108 provided by the fuel source 102 may include any grade or quality of ambient gas-phase fluid suitable for combustion by the engine 104 (e.g., gaseous fuels ranging from methane to landfill gas to coal gas, and from LNG to propane gas). In some examples, such as described below, the fuel metering valve 200 is an integrated, digitally compensated control valve and actuator system for regulating and metering the flow of gaseous fuel 108 provided from the fuel source 102, such that the engine 104 receives a metered flow of gaseous fuel 108' suitable for providing a required power output. The ECU 106 sends and receives signals 110a, 110b to and from the fuel metering valve 200 and the engine 104 to ensure proper operation of the engine 104 during use. As one particular example, the fuel metering valve 200 may be designed to receive a fuel rate demand signal 110b from the ECU 106. The fuel rate demand signal 110b may correspond to a physical mass flow rate of fuel required by the engine 104. As described below, the fuel metering valve 200 incorporates feedback sensors which monitor fuel pressure, temperature, and valve pressure differential. Based on these sensor signals, the fuel metering valve 200 modulates a valve opening to produce the physical mass flow rate of fuel 108'.

In the foregoing description of the combustion engine system 100, various items of equipment, such as pipes, valves, pumps, fasteners, fittings, etc., may have been omitted to simplify the description. However, those skilled in the art will realize that such conventional equipment can be employed as desired. Those skilled in the art will further appreciate that various components described are recited as illustrative for contextual purposes and do not limit the scope of this disclosure.

FIGS. 2A-2D depict an example fluid metering valve 200 that can, for example, be incorporated in the combustion engine system 100 described above. As shown, the fuel metering valve 200 includes a valve body 202 housing a valve element 204 (see FIG. 2D), a sensor module 206, an actuator 208, and valve controller 210. The valve body 202 is situated between an inlet pipe 212 and an outlet pipe 214. The inlet pipe 212 includes a tubular body 216a bracketed by an inner flange 218a and an outer flange 220a. Similarly, the outlet pipe 214 includes a tubular body 216b bracketed by an inner flange 218b and an outer flange 220b. The inner flanges 218a, 218b are coupled to mating flanges 222 of the valve body 202 by mechanical fasteners 224. The flanges 222 define an inlet port and an outlet port of the valve body 202. The inlet pipe 212 is couplable to upstream piping leading from the fuel source 102 via the outer flange 220a. The outlet pipe is couplable to downstream piping leading to the engine 104 via the outer flange 220b.

Figure 2A:
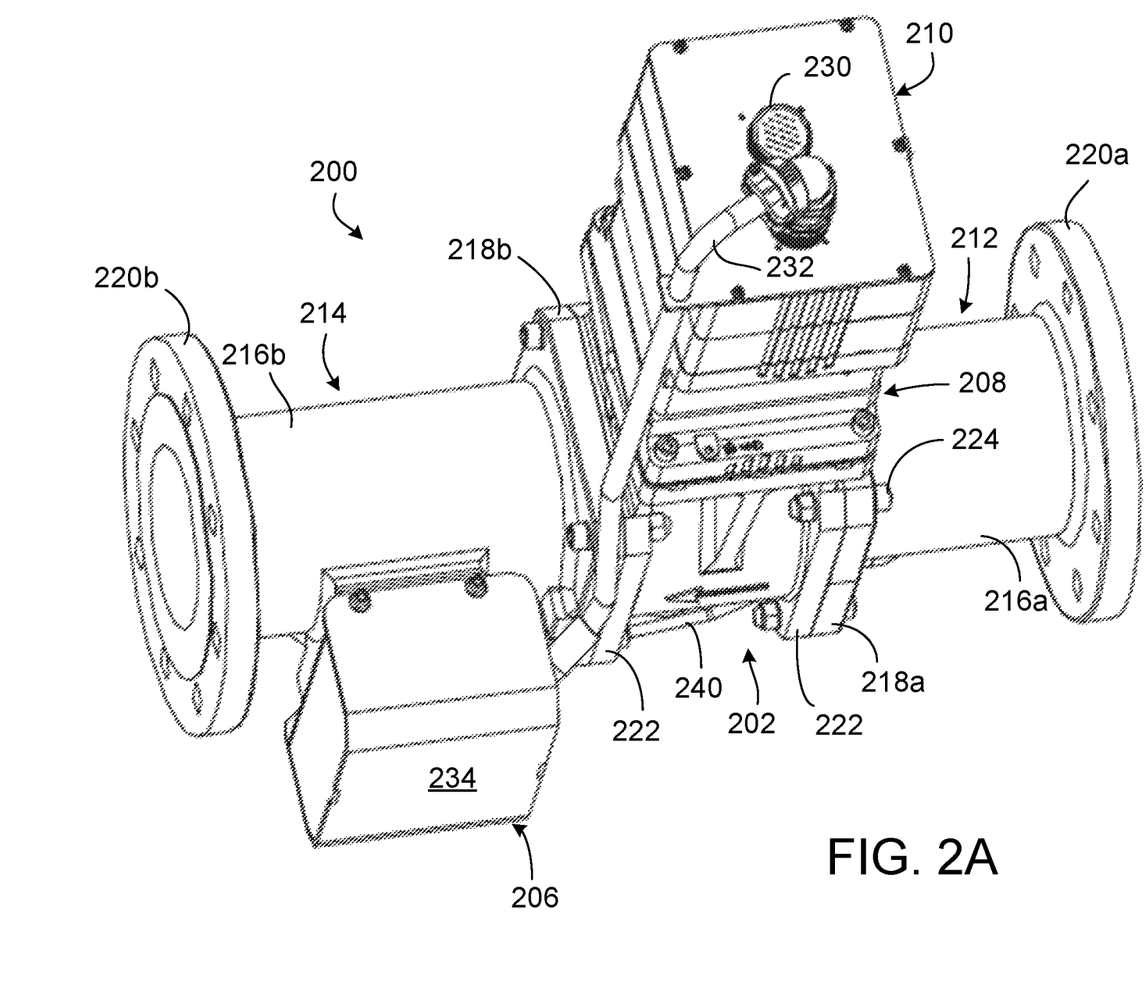
FIGS. 2A-2D are perspective, top, rear and front views of an example fuel metering valve.
Figure 2B:
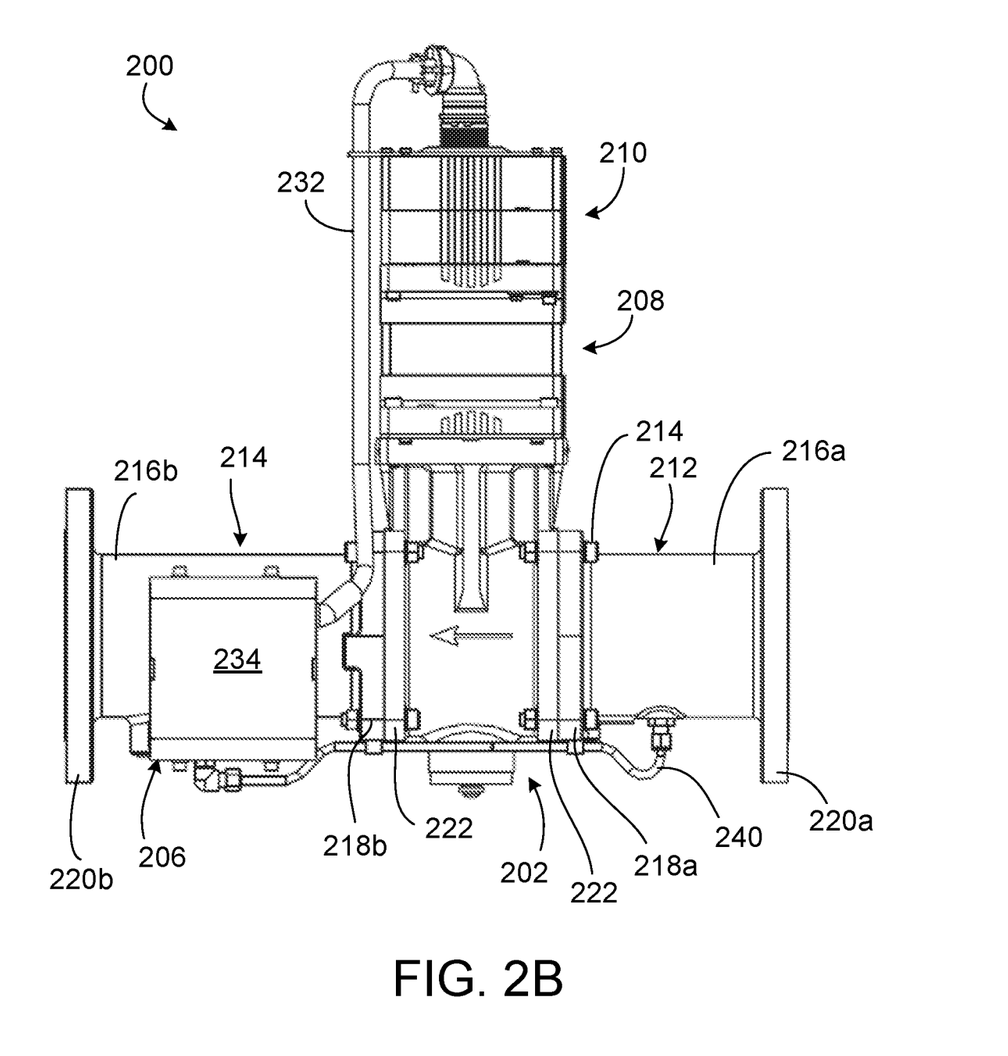
Figure 2C:
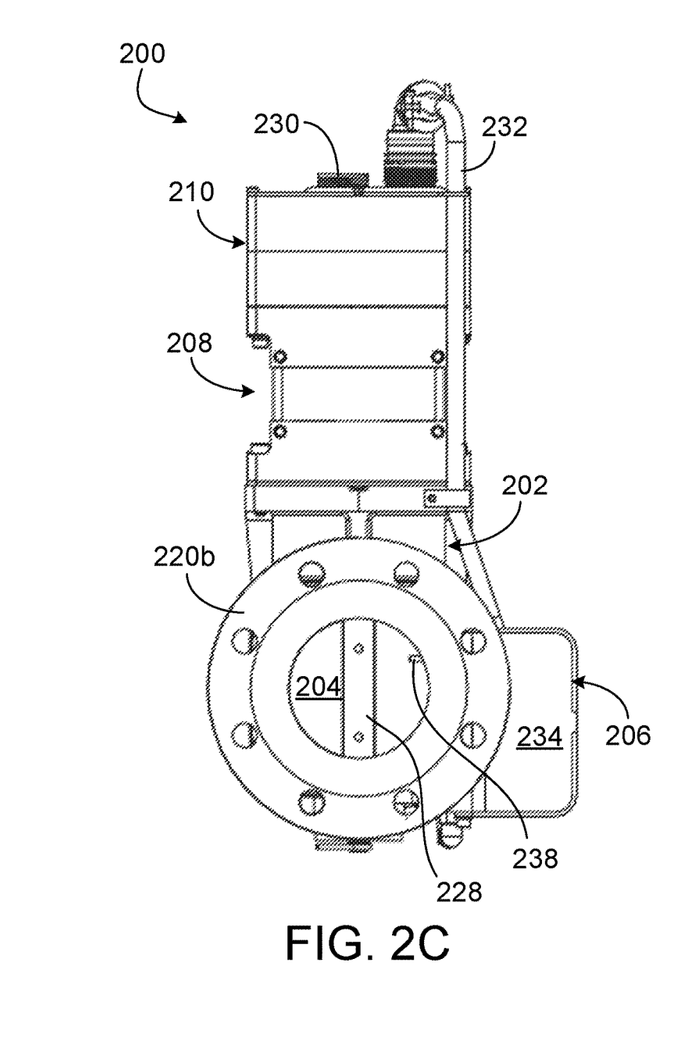
Figure 2D:
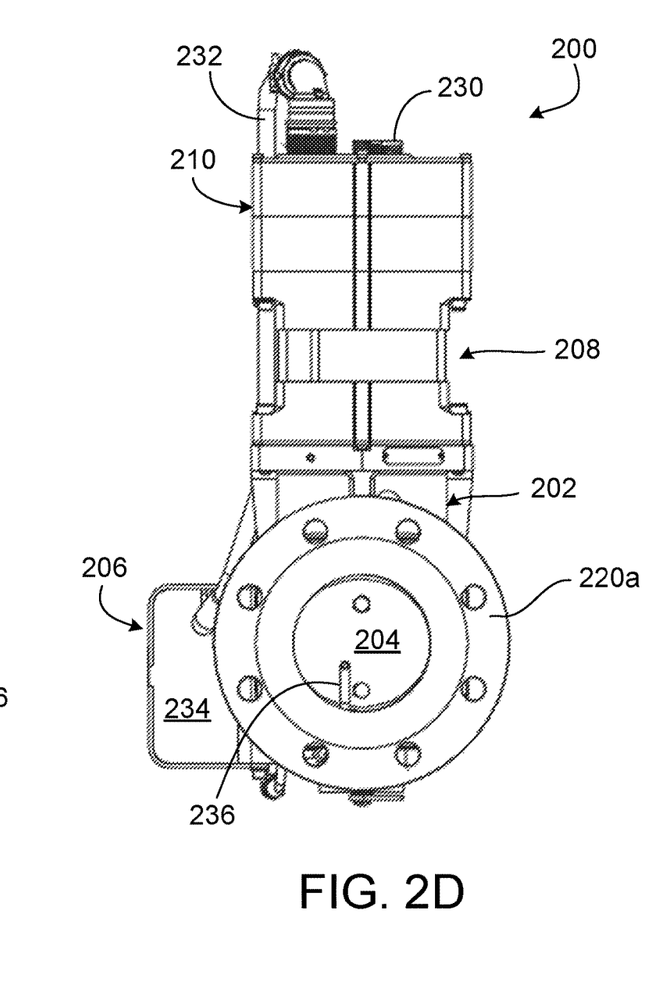

An interior chamber is provided between the flanges 222 of the valve body 202 to house the valve element 204 (see FIG. 2D). The central bores of the inlet and outlet pipes 212, 214 are aligned with the inlet and outlet ports of the valve body 202, and therefore in fluid communication with the interior chamber to form a continuous flow path through the fluid metering valve 200. The valve element 204 is movable relative to the valve body 202 to regulate the flow of gaseous fuel 108 passing therethrough by altering the size of the flow path through the valve ("the valve area"). Movement of the valve element 204 to constrict the valve area will decrease the mass flow rate of the fuel, and movement to open the valve area will increase the fuel mass flow rate. In this example, the valve element 204 is a rotating butterfly valve mounted on a rotatable valve shaft 228. The valve shaft 228 is coupled to the rotating drive stem (not shown) of the actuator 208. The actuator 208 acts as a rotary positioner to rotate the valve shaft 228, and therefore, the valve element 204, to a specified angular position. In this example, the actuator 208 includes an electromagnetic servo drive system including a displacement sensor and an integral controller. However, other suitable drive systems, such as an electro-hydraulic servo drive, a stepper motor, a pneumatic actuator, or a limited angle torque motor, may be used without departing from the scope of the present disclosure.

The valve element 204 is depicted in FIGS. 2C and 2D at a fully-closed position, having the face of its butterfly disk fully aligned with the inlet port of the valve body 202 to block fluid flow. Progressive rotation of the valve element 204 along the central axis of the valve shaft 228 turns the butterfly disk out of alignment with the inlet port of the valve body 202 to gradually open the flow path and increase the valve area, which increases the mass flow rate of gaseous fuel delivered to the engine 104. The valve element 204 can be rotated by the actuator 208 via the valve shaft 228 through numerous positions between the fully-closed position and a fully-opened position, where the butterfly disk is turned away from (e.g., orthogonal to) the inlet port of the valve body 202.

The valve controller 210 of the example fluid metering valve 200 is communicatively coupled to the actuator 208. The circuitry of the valve controller 210 can include one or more microprocessors configured to execute computer-readable instructions stored on one or more memory devices so as to achieve any of the control operations described herein. In some examples, during use, the valve controller 210 provides a position command signal that is received by the integral controller of the actuator 208 and executed by the drive system to alter the angular position of the valve element 204 within the valve body 202, as described above. The valve controller 210 derives the position command signal based on a fuel rate demand signal 110b (see FIG. 1) received from the ECU 106 (see FIG. 1) via a data port 230. That is, the valve controller 210 determines the angular position of the valve element 204 that corresponds to the valve area needed to physically achieve the mass flow rate indicated by the fuel rate demand signal 110b. In this example, the valve controller 210 is configured (e.g., appropriately equipped and programmed) to calculate the valve area and derive the corresponding position command signal under both subsonic and sonic flow regimes. Further, in some examples, the valve controller 210 may be fully integrated with the actuator 208, such that the valve controller 210 directly operates the drive system of the actuator 208.

In the exemplary embodiment, the sensor module 206 is communicatively coupled to the valve controller 210 via a data transmission cable 232. The sensor module 206 includes a housing 234 mounted to the outlet pipe 214, and a collection of sensors enclosed within an internal space of the housing 234 that continually provide output to the valve controller 210 via the data transmission cable 232 at a predetermined sampling rate. The valve controller 210 receives the sensory output signal and calculates the requisite valve area based on the data contained therein. In this example, the sensor module 206 includes an inlet pressure sensor, a differential pressure sensor, and a temperature sensor (see FIG. 3). However, other suitable sensor configurations are also contemplated within the scope of the present disclosure. As shown in FIGS. 2C and 2D, the fuel metering valve 200 includes a stagnation (total) pressure probe 236 (e.g., a pitot probe) mounted on the inlet pipe 212, as well as a static pressure probe (not shown) and a temperature probe 238 mounted on the outlet pipe 214. A fluid line 240 fluidically couples the stagnation pressure probe 236 to the sensor module 206.

Figure 3:
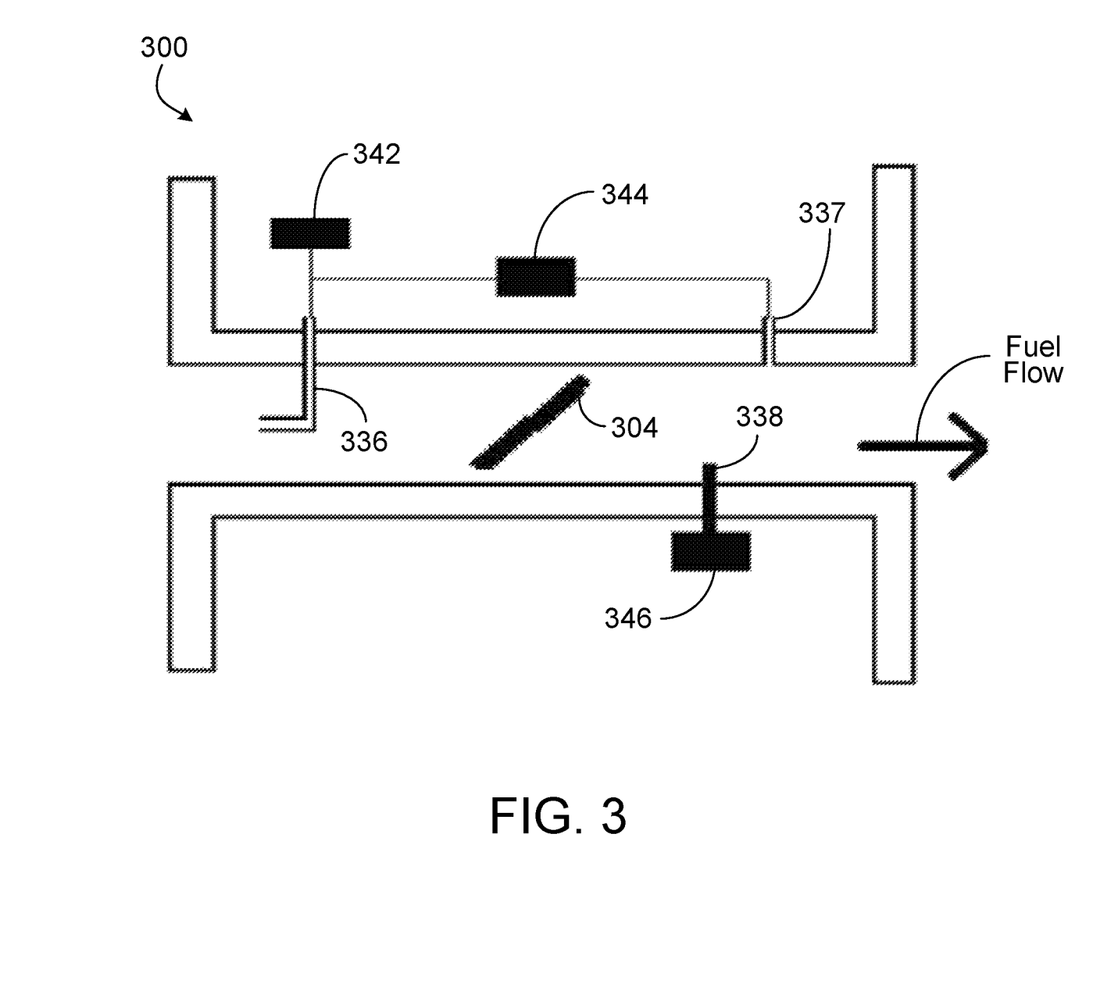
FIG. 3 is a schematic diagram of a portion of an example fuel metering valve.

FIG. 3 illustrates an example sensor configuration suitable for use with an example fuel metering valve 300. In this example, the fuel metering valve 300 includes an inlet pressure sensor 342 fluidically coupled to a stagnation pressure probe 336 located on the inlet (upstream) side of the valve element 304, a differential pressure sensor 344 fluidically coupled to the stagnation pressure probe 336 and a static pressure probe 337 located on the outlet (downstream) side of the valve element 304, and a temperature sensor 346 coupled to a temperature probe 338 (e.g., a thermocouple or a thermistor) located on the outlet side of the valve element 304. The inlet pressure sensor 342 is appropriately configured to measure the absolute total pressure of the incoming flow of gaseous fuel 108 provided by the fuel source 102 (see FIG. 1). The differential pressure sensor 344 is appropriately configured to measure the stagnation-to-static pressure difference across the valve element 304. In some examples, the differential pressure sensor is a dual-port resistive or capacitive pressure transducer.

Referring back to FIGS. 2A-2D, the valve controller 210 is configured to facilitate control of the valve element 204 via the actuator 208 by implementing appropriate flow equations (which may be stored in computer memory) that use the sensory output provided by the sensor module 206 (e.g., upstream total pressure (absolute), pressure differential across the valve element 204, and downstream temperature) as input variables in order to meet the physical mass fuel rate indicated by the fuel rate demand signal 110b from the ECU 106. In some implementations, various operating conditions of the engine 104 may cause the fuel metering valve 200 to experience either subsonic or sonic flow at the minimum area of the valve element 204. Sonic flow occurs when the velocity of the gaseous fuel flow, at the minimum area of the valve element 204, reaches a Mach number of 1. For a given gas flowing through the fuel metering valve 200 at a given temperature, there is a critical pressure ratio ($P_{cr}$) of the outlet (downstream) pressure to the inlet (upstream) pressure ($P_o/P_i$) at which sonic flow occurs. The critical pressure ratio is not the same for all gases, for instance it is about 0.53 for air, about 0.54 for natural gas, and about 0.58 for propane. When sonic flow occurs at the minimum area of the valve element 204, downstream pressure (e.g., pressure differential) no longer has an effect on the velocity, and therefore mass flow rate, of the gaseous fuel. However, during subsonic flow conditions, the fuel mass flow rate is highly dependent on pressure differential. Accordingly, the valve controller 210 may be appropriately configured to implement a first set of one or more flow equations upon a detection of subsonic flow conditions, and a second set of one or more different flow equations upon a detection of sonic flow conditions. In some examples, the valve controller 210 may monitor the ratio of downstream to upstream pressure based on the sensory output of the inlet pressure sensor and the differential pressure sensor to detect when sonic flow occurs.

Generally, fuel mass flow is a function of the valve area, fuel pressure and fuel temperature, along with one or more properties of the gaseous fuel (e.g., gas constants). Likewise, the error associated with the fuel mass flow is a function of the errors associated with each individual input. As suggested above, a significant difference between subsonic mass flow equations and the sonic mass flow equations is the downstream or differential pressure measurement, which is only used as an input with subsonic flow. Thus, reducing the error in the downstream or differential pressure measurement directly reduces the subsonic mass flow error, but not the sonic mass flow error. Accordingly, one or more embodiments of the present disclosure are based on a realization that the percent-of-point accuracy of the fuel metering valve 200 may be directly improved by utilizing a differential pressure sensor (or a downstream pressure sensor) that is calibrated for less than the entire operating range of differential pressures which the fuel metering valve 200 is designed to accommodate. In some examples, the percent-of-point accuracy of the fuel metering valve 200 can be improved by utilizing a differential pressure that is calibrated over a range that only exceeds the maximum expected subsonic pressure differential (within an appropriate error margin). With this technique, the percent-of-point accuracy for the fuel metering valve 200 is directly improved without incorporating a more accurate, and therefore more expensive, differential pressure sensor. In this context, the "maximum expected subsonic pressure differential" refers to the largest magnitude pressure difference $(P_i-P_o)$ that corresponds to a pressure ratio $(P_o/P_i)$ greater than or equal to the critical pressure $(P_{cr})$ for a given gaseous fuel over the expected range of operating conditions of the combustion engine system 100.

The added benefit of the above-described technique is demonstrated by the following non-limiting example. In this example, the fuel metering valve is designed to operate within a combustion engine system having an inlet pressure range between 0 and 100 psia. The maximum expected subsonic pressure differential is 45 psid. The accuracy of the differential pressure sensor is set at 1% of the full scale of the sensor. A first differential pressure sensor is calibrated over a scale range limited from 0 to 100 psid (i.e., the full range of the fuel metering valve), and therefore produces a total error of 1 psid over the total scale. A second differential pressure sensor is calibrated over a scale range from 0 to 45 psid (i.e., a limited range corresponding to the maximum expected subsonic pressure differential), and therefore produces a total error of 0.45 psid over the total scale. In this example, in order to have the same percent-of-point accuracy for the fuel metering valve, the first differential pressure sensor would have required an accuracy of 0.45% of the full scale of the sensor, which is considerably less than the 1% accuracy specification for the second differential pressure sensor.

Figure 4:
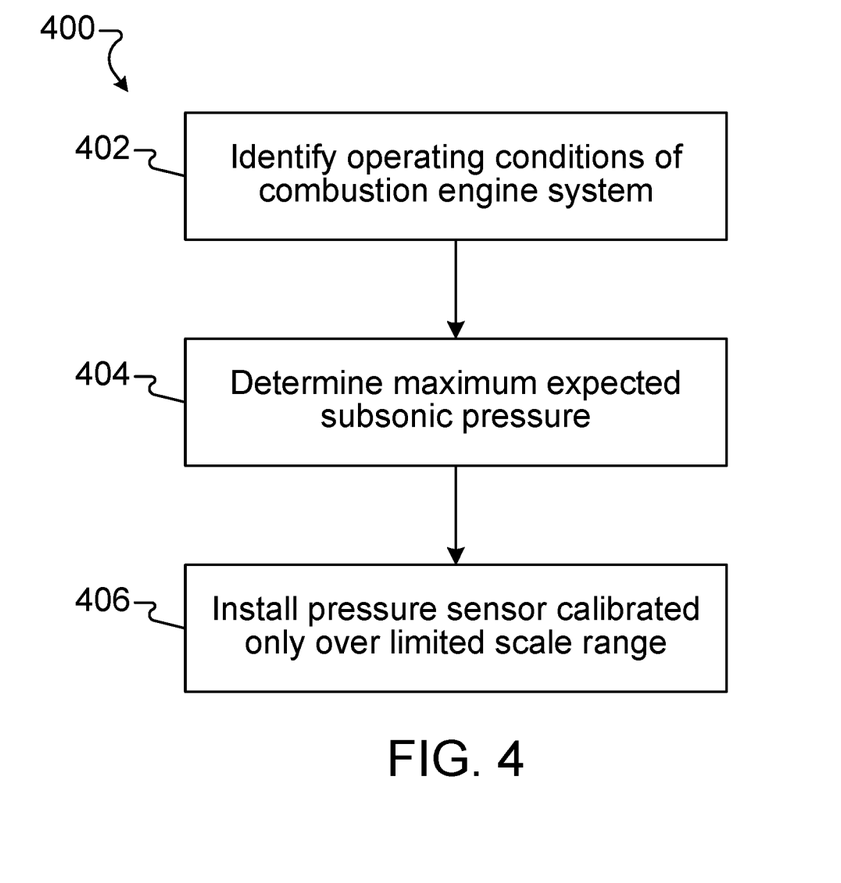
FIG. 4 is a flow chart of a process for constructing an example fuel metering valve.

FIG. 4 illustrates a process 400 for constructing a fuel metering valve (e.g., the fuel metering valve 200). The process 400 can be implemented, for example, in connection with one or more components of the combustion engine system 100. Further, the operations of the processes do not require the any particular order to achieve desirable results. In addition, other operations may be provided, or operations may be eliminated, from the described processes without departing from the scope of the present disclosure.

According to the process 400, a plurality of operating conditions over the expected operating range of the combustion engine system 100 are identified (402). In some examples, each of the plurality of operating conditions can be expressed in terms of the respective upstream and downstream pressures on either side of the fuel metering valve. The upstream pressure may correspond to the supply pressure between the fuel source and the fuel metering valve. The downstream pressure may correspond to the fuel chamber pressure or the cylinder pressure of the engine. In some examples, the plurality of operating conditions may be identified via simulation (e.g., via suitable computational modeling software) or empirical testing. The maximum expected subsonic pressure is determined (404) based on the identified (402) plurality of operating conditions. In some examples, the maximum expected subsonic pressure may be determined in terms of a pressure differential between the upstream and downstream sides of the valve element. In such examples, the maximum expected subsonic pressure differential may be determined as the largest magnitude pressure difference that corresponds to a pressure ratio greater than or equal to the critical pressure for a given gaseous fuel over the identified (402) plurality of operating conditions. A pressure sensor calibrated over a limited scale range selected based on the maximum expected subsonic differential pressure is installed (406) in the fuel metering valve. In some examples, the limited scale range defines an upper limit less than or equal to a predetermined maximum differential pressure of the fuel metering valve. In some examples, the limited scale range defines an upper limit greater than or equal to the maximum expected subsonic differential pressure. In some embodiments, the pressure sensor is installed to directly measure a differential pressure across the valve element. In some examples, the pressure sensor may be installed within the housing of a sensor module communicatively coupled to the main controller of the fuel metering valve.

A number of embodiments of the invention have been described. Nevertheless, it will be understood that various modifications may be made without departing from the spirit and scope of the inventions. For example, various other types of valve elements and assemblies (e.g., flapper valves, single-port ball valves, globe valves, etc.) may be used in conjunction with one or more devices, systems and methods descried above. As another example, various other types of pressure probes and sensors may be utilized. For instance, the differential pressure sensor described above may be replaced with a pressure sensor arranged to measure the absolute pressure on the downstream side of the valve element. In this case, the pressure differential may be calculated by the valve controller, as opposed to being directly measured. A maximum expected subsonic downstream pressure is determined from the expected operating conditions, and the downstream pressure sensor is calibrated over a limited scale range within the determined pressure. As yet another example, the combustion engine system described above may include two or more fuel metering valves, such as may be used in conjunction with a multistage gas turbine.

What is claimed is:

1. A fuel metering valve, comprising:
a valve body housing a valve element in an interior chamber between an inlet port and an outlet port, the valve element regulating a flow of fuel through the valve body and having a predetermined maximum inlet pressure;
an actuator coupled to move the valve element relative to the valve body;
a controller configured to regulate the position of the valve body via the actuator based on differential and absolute pressure measurements to achieve a target mass flow rate of the fuel through the valve body and identify a sonic or subsonic flow condition across the valve element based on the pressure measurements; and
differential and absolute pressure sensors arranged to provide the pressure measurements, the differential pressure sensor fluidically coupled to an upstream pressure probe and a downstream pressure probe, such that the differential pressure measurement corresponds to a pressure differential across the valve element, and
wherein the differential pressure sensor is calibrated for accuracy only across a limited scale range that is equal to or less than the predetermined maximum inlet pressure, wherein the limited scale range is based on a predetermined maximum subsonic differential pressure that is less than a sonic differential pressure and comprises a maximum expected subsonic pressure differential determined as the largest magnitude pressure difference that corresponds to a pressure ratio greater than or equal to the critical pressure for the fuel over an expected range of system operating conditions;
wherein the controller is further configured to:
in response to identifying a subsonic flow condition, implement a first set of one or more flow equations to achieve the target mass flow rate; and
in response to identifying a sonic flow condition, implement a second set of one or more flow equations, different than the first set of one or more flow equations, to achieve the target mass flow rate.

2. The fuel metering valve of claim 1, wherein the controller is configured to identify a sonic or subsonic flow condition across the valve element based on the pressure measurements, and wherein the controller is further configured to:
in response to identifying a subsonic flow condition, implement a first set of one or more flow equations to achieve the target mass flow rate; and
in response to identifying a sonic flow condition, implement a second set of one or more different flow equations to achieve the target mass flow rate.

3. The fuel metering valve of claim 2, wherein only the first set of flow equations include the differential pressure measurement as an input.

4. The fuel metering valve of claim 1, wherein the upstream pressure probe comprises a pitot probe and the downstream pressure probe comprises a static pressure probe.

5. The fuel metering valve of claim 1, wherein the limited scale range defines an upper limit that is at least one of:
less than or equal to a predetermined maximum differential pressure of the fuel metering valve; or
greater than or equal to the predetermined maximum subsonic differential pressure.

6. A combustion engine system, comprising:
a fuel source;
an engine that generates mechanical power via combustion of a flow of fuel provided by the fuel source; and
a fuel metering valve located upstream of the engine and downstream of the fuel source, the fuel metering valve regulating the flow of fuel provided from the fuel source, and wherein the fuel metering valve comprises:
a valve body housing a valve element in an interior chamber between an inlet port and an outlet port, the valve element regulating a flow of fuel through the valve body and having a predetermined maximum inlet pressure;
an actuator coupled to move the valve element relative to the valve body;
a controller configured to regulate the position of the valve body via the actuator based on differential and absolute pressure measurements to achieve a target mass flow rate of the fuel through the valve body and identify a sonic or subsonic flow condition across the valve element based on the pressure measurements; and
differential and absolute pressure sensors arranged to provide the pressure measurements, the differential pressure sensor fluidically coupled to an upstream pressure probe and a downstream pressure probe, such that the differential pressure measurement corresponds to a pressure differential across the valve element, and
wherein the differential pressure sensor is calibrated for accuracy only across a limited scale range that is equal to or less than the predetermined maximum inlet pressure, wherein the limited scale range is based on a predetermined maximum subsonic differential pressure that is less than a sonic differential pressure and comprises a maximum expected subsonic pressure differential determined as the largest magnitude pressure difference that corresponds to a pressure ratio greater than or equal to the critical pressure for the fuel over an expected range of system operating conditions;
wherein the controller is further configured to:
in response to identifying a subsonic flow condition, implement a first set of one or more flow equations to achieve the target mass flow rate; and
in response to identifying a sonic flow condition, implement a second set of one or more flow equations, different than the first set of one or more flow equations, to achieve the target mass flow rate.

7. The combustion engine system of claim 6, further comprising an engine control unit communicatively coupled to the fuel metering valve and configured to provide the target mass flow rate via a fuel demand signal.

8. The combustion engine system of claim 6, wherein the controller is configured to identify a sonic or subsonic flow condition across the valve element based on the pressure measurements, and wherein the controller is further configured to:
in response to identifying a subsonic flow condition, implement a first set of one or more flow equations to achieve the target mass flow rate; and
in response to identifying a sonic flow condition, implement a second set of one or more different flow equations to achieve the target mass flow rate.

9. The combustion engine system of claim 8, wherein only the first set of flow equations include the differential pressure measurement as an input.

10. The combustion engine system of claim 6, wherein the upstream pressure probe comprises a pitot probe and the downstream pressure probe comprises a static pressure probe.

11. The combustion engine system of claim 6, wherein the limited scale range defines an upper limit that is at least one of:
    less than or equal to a predetermined maximum differential pressure of the fuel metering valve; or
    greater than or equal to the predetermined maximum subsonic differential pressure.

12. A method of constructing a fuel metering valve, the method comprising:
    identifying a plurality of operating conditions comprising a plurality of upstream and downstream pressure pairs over an expected operating range of a combustion engine system;
    determining a maximum expected subsonic differential based on the plurality of upstream and downstream pressure pairs, wherein the maximum expected subsonic differential is a largest magnitude pressure difference that corresponds to a pressure ratio greater than or equal to a critical pressure for a predetermined fuel based on;
    installing a differential pressure sensor arranged to provide a differential pressure measurement into the fuel metering valve by fluidically coupling the differential pressure sensor to an upstream pressure probe and a downstream pressure probe, such that the differential pressure measurement corresponds to a pressure differential across a valve element of the fuel metering valve, the differential pressure sensor being calibrated for accuracy only across a limited scale range that is equal to or less than a predetermined maximum inlet pressure of the fuel metering valve, wherein the limited scale range is based on the determined maximum expected subsonic differential pressure that is less than a sonic differential pressure;
    installing an actuator coupled to move a valve element of the fuel metering valve relative to a valve body of the fuel metering valve; and
    installing a controller configured to (i) regulate the position of the valve body via the actuator based on differential and absolute pressure measurements to achieve a target mass flow rate of the fuel through the valve body and identify a sonic or subsonic flow condition across the valve element based on the pressure measurements, (ii) implement, in response to identifying a subsonic flow condition, a first set of one or more flow equations to achieve the target mass flow rate, and (iii) implement, in response to identifying a sonic flow condition, a second set of one or more flow equations, different than the first set of one or more flow equations, to achieve the target mass flow rate.

13. The method of claim 12, wherein the upstream pressure probe comprises a pitot probe and the downstream pressure probe comprises a static pressure probe.

14. The method of claim 12, wherein installing the differential pressure sensor further comprises positioning the differential pressure sensor within a housing of a sensor module communicatively coupled to a main controller of the fuel metering valve.

15. The method of claim 12, wherein the limited scale range defines an upper limit that is at least one of:
    less than or equal to a predetermined maximum differential pressure of the fuel metering valve; or
    greater than or equal to the maximum expected subsonic differential pressure.

* * * * *